(12) United States Patent
Lee et al.

(10) Patent No.: US 6,931,652 B2
(45) Date of Patent: Aug. 16, 2005

(54) SPINDLE MORTOR FOR OPTICAL DISK DRIVE HAVING A STATOR WITH UPPER TRACKS AT DIFFERENT HEIGHTS

(75) Inventors: Chil Sung Lee, Suwon-Shi (KR); Tae Heon Kim, Yongin-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 108 days.

(21) Appl. No.: 10/412,440

(22) Filed: Apr. 11, 2003

(65) Prior Publication Data
US 2004/0114498 A1 Jun. 17, 2004

(30) Foreign Application Priority Data
Dec. 12, 2002 (KR) .................................. 10-2002-0079068

(51) Int. Cl.⁷ ................................................. G11B 7/08
(52) U.S. Cl. ....................................................... 720/696
(58) Field of Search .............................. 720/696, 697; 310/156.01; 360/99.12

(56) References Cited

U.S. PATENT DOCUMENTS 6,366,427 B1 * 4/2002 West ....................... 360/99.12
6,479,912 B2 * 11/2002 Kikuchi et al. .............. 310/51
6,501,617 B1 * 12/2002 Harada et al. ........... 360/99.08
6,512,315 B1 * 1/2003 Yamaguchi .................. 310/51

* cited by examiner

Primary Examiner—David Davis
(74) Attorney, Agent, or Firm—Darby & Darby

(57) ABSTRACT

The present invention relates to a spindle motor employed for a disk player. The spindle motor comprises: a deck plate; a shaft rotatably disposed on the deck plate; a stator having a core wound with coils which is disposed on the outer peripheral surface of the shaft and generates a magnetic force; a magnet which is provided at the upper part of the stator and generates a magnetic force; a cap type rotor which is coupled to the upper end of the shaft integrally with the shaft so as to be located at the upper part of the pulling magnet and the stator and is provided on the upper part with a track having a different height from another; a magnet which is disposed on the inner peripheral surface of the rotor so that it can be opposed to the core of the stator with an air gap therebetween; and a turntable which is disposed on the upper surface of the rotor integrally with the rotor and mounts a disk.

3 Claims, 4 Drawing Sheets

SPINDLE MORTOR FOR OPTICAL DISK DRIVE HAVING A STATOR WITH UPPER TRACKS AT DIFFERENT HEIGHTS

BACKGROUND OF THE INVENTION

1. Field of the Invention

The present invention relates to a small-sized spindle motor employed for a disk player, more particularly to a spindle motor which has a more compact structure due to a decrease of its height.

2. Description of the Related Art

In general, an optical disk is capable of high-density recording and reproducing as compared to a magnetic recording tape and a LP and can be stored semi-permanently. Due to its merits, recently, disk players utilizing optical disks have been being widely spread.

Such a disk player includes a laser disk player, a compact disk player and a DVD (digital versatile disk) player and the like. Among such optical disk players, particularly, compact disk players, which have a small size and are portable, have been being widely spread. Recently, however, DVDs, which have the same size as compact disks while having a larger memory capacity than the compact disks, are being rapidly spread.

Disk players of this type are being minimized in size, height and weight so that users can carry them conveniently, and, in the future, slim type disk players having a 9.5 mm height are expected to form the mainstream.

One of the most important components in this disk player is a spindle motor for a drive for rotating a disk at a high speed without a movement. Spindle motors are also being miniaturized so as to conform to the miniaturization of disk players.

Of course, the miniaturized spindle motors have to be developed such that they can show a high-speed performance at a minimum current though its size becomes smaller, minimize vibration generated during driving and prevent the deviation of a disk during high speed driving.

Figure 1:
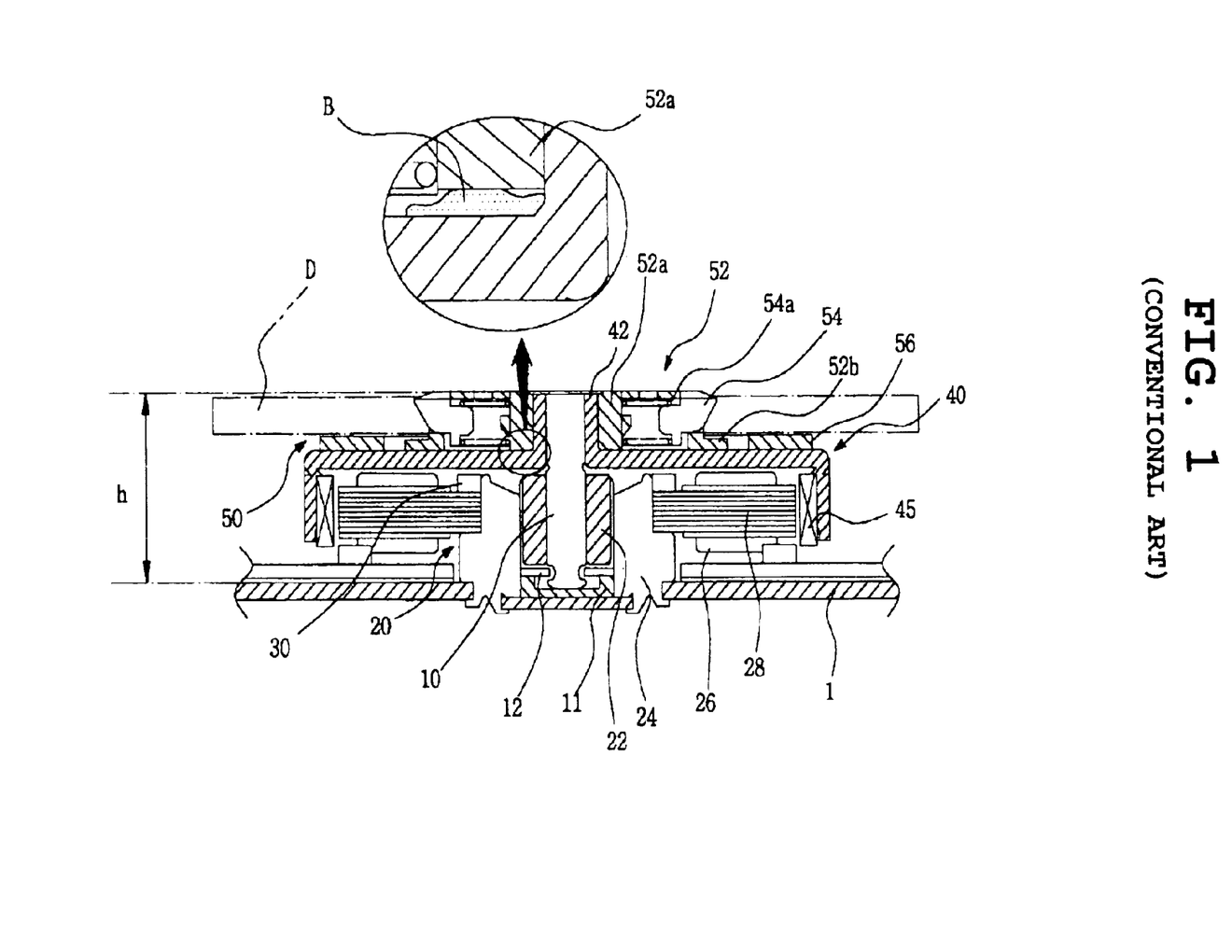
FIG. 1 is a side cross-sectional view illustrating the construction of a conventional spindle motor for a disk drive.

FIG. 1 is a side cross-sectional view illustrating a conventional spindle motor for a disk drive.

As illustrated therein, the spindle motor includes a deck plate 1 which has a circuit substrate mounted on the upper surface and is fixed to a disk player (not shown) and a shaft 10 rotatably disposed perpendicularly to the deck plate 1.

On the lower end face of the shaft 10 is disposed a thrust bearing 11 for preventing the friction between the shaft 10 and the deck plate 1. To the lower end of the shaft is engaged a stopper ring 12 for preventing the shaft from deviating upwardly by a centrifugal force generated during high-speed rotation.

And, the spindle motor also includes a stator 20 composed of a cylindrical metal bearing 22 which is disposed on the outer peripheral surface of the shaft 10 and supports the shaft 10 so as to stand vertically, a cylindrical holder 24 disposed on the outer peripheral surface of the metal bearing 22 and a core 28 wound with coils 26 which is disposed on the outer peripheral surface of the holder 24 and generates a magnetic force by an applied power.

Additionally, a cap type rotor 40 of metallic material is coupled to the upper end of the shaft 10 so as to be located at the upper part of the stator 20. The rotor 40 and the shaft 10 are integrally formed because the shaft 10 is press-fit to the inner peripheral surface of a cylindrical boss 42 protruding at the center portion of the rotor 40.

Moreover, a magnet 45 is disposed on the inner peripheral surface of the rotor 40 so that it can be opposed to the core 28 of the stator 20 with an air gap therebetween. A pulling magnet 30 is disposed on the upper part of the stator 20 and pulls the rotor 40 downward by a magnetic force.

Meanwhile, on the upper surface of the rotor 40 is disposed a turntable 50 which is fixedly installed integrally with the rotor 40 and mounts a disk (D). The turntable 50 includes a disk chuck 52 on which the disk (D) is centered so as to be mounted at the precise position of the turntable 50, a jaw 54 which is slidably disposed at the disk chuck 52 and fixes the disk (D) mounted on the disk chuck 52 and a disk seat 56 which supports the mounted disk (D) from a lower side.

Of course, the jaw 54 is inserted into the lateral side of the disk chuck 52 along with a spring 54a and the disk seat 56 is formed in a flange extending from the lower part of the disk chuck 52 and is formed integrally with the disk chuck 52.

Here, the integral fixing of the turntable 50 and the rotor 40 will be explained in more detail. The disk chuck 52 is formed with a hub 52a penetrating through the center. After positioning the hub 52a of the disk chuck 52 at the boss 42 of the rotor 40, the boss 42 is press-fit to the inner peripheral surface of the hub 52a by pressurizing the disk chuck 52 from an upper side.

Of course, in order to press-fit the boss 42 of the rotor 40 to the hub 52a of the disk chuck 52, the outer diameter of the boss 42 and the inner diameter of the hub 52a must be made identical by precision finishing. Because the outer diameter of the boss 42 is the same as the inner diameter of the hub 52a, the disk chuck 52 is forced-fit to the rotor 40.

At this time, the disk chuck 52 is forced-fit to the rotor 40 after coating an adhesive (B) on the outer peripheral surface of the boss 42 of the rotor 40 so as to make the press-fit disk chuck 52 more firmly fixed thereto.

That is, the disk chuck 52 is firmly fixed by bonding-fixing the disk chuck 52 to the rotor 40 as well as press-fitting it thereto.

In the thus constructed conventional spindle motor for the disk drive, the disk (D) is fixed by centering a through hole formed at the center of the disk (D) on the disk chuck 52 of the turntable 50. During the fixing, the jaw 54 is slid into the lateral side of the disk chuck 52 via the through hole formed on the disk (D). Thereafter, when the centering is finished, the jaw 54 compresses the inside of the through hole of the disk (D) while slidably protruding to the outside of the disk chuck 52 by an elastic force of the spring 54a, thereby firmly fixing the disk (D).

Once the fixing of the disk (D) is finished, a power is applied to the coils 26 of the stator 20 to generate a magnetic force on the core 28. This makes the magnetic force of the core 28 and the magnetic force of the magnet 45 to interact with each other.

Then, the core 28 and the magnet 45 rotate the rotor 40 along with the shaft 10 at high speed by the interaction between their generated magnetic forces.

At this time, the shaft 10 can rotate at a high speed smoothly and vertically without movement by the metal bearing 22 disposed on the outer peripheral surface. Even if the shaft 10 is rotated at a high speed by the stopper ring 12 disposed at the lower end, it does not deviate upward.

That is, the metal bearing 22 supports the shaft 10 rotating at a high speed from the outer peripheral surface and the stopper ring 12 interrupts the shaft 10 from being lifted by a centrifugal force caused by the high-speed rotation.

The rotor 40 rotating at a high speed along with the shaft 10 is also likely to be lifted by the centrifugal force caused by the high-speed rotation, but is prevented from being lifted owing to an attractive force of the pulling magnet 30.

By the rotation of the rotor 40, the turntable 50 fixedly disposed on the upper surface of the rotor 40 rotates and the disk (D) mounted on the turntable 50 also rotates at a high speed along with the turntable 50. Therefore, the disk player (not shown) can records data on the disk (D) or reproduce the recorded data within a short time.

Of course, the disk (D) is firmly fixed by the jaw 54 of the turntable 50, so it is not lifted or deviated from the turn table 50 even when rotated at a high speed. Also, it is not lifted or deviates by a disk clamp (not shown) pressurizing the disk (D) from an upper side.

However, in the above-described conventional spindle motor for the disk drive, when the boss 42 of the rotor 40 is forced-fit to the hub 52a of the disk chuck 52, the adhesive (B) coated on the boss 42 is all squeezed out downward and is aggregated at one portion of the upper surface of the rotor 40.

Therefore, the turntable 50 is not tightly fixed to the upper surface of the rotor 40 by the adhesive (B) aggregated on the upper part of the rotor 40, but is fixed thereto, being lifted upward as much as the thickness of the adhesive (B) and accordingly there occurs a problem that the height (h) of the spindle motor is also increased as much as the lifted length of the turntable 50.

And, since the adhesive (B) is aggregated on one portion of the upper surface of the rotor 40, the adhesion surface area of the disk chuck 52 is decreased to thus cause the weakening of the adhesion force. This leads to a problem that the turntable 50 deviates from the rotor 40 by a centrifugal force during high-speed rotation of the rotor 40 to thus reduce the life span of the spindle motor.

SUMMARY OF THE INVENTION

To solve the above-indicated problems, it is, therefore, an object of the present invention to provide a spindle motor for a disk drive which can strengthen the adhesive force of a turntable by forming on the upper part of a rotor a stepped track containing an adhesive and the lower part of the turntable and which can reduce the overall height of the spindle motor as much as the depth of the lower part of the turntable contained in the track.

To achieve the above object, there is provided a spindle motor for a disk drive according to the present invention, which is used for a disk player, comprising: a deck plate; a shaft rotatably disposed on the deck plate; a stator composed of a metal baring disposed on the outer peripheral surface of the shaft, a holder disposed on an outer side of the metal bearing and a core having coils disposed on the outer peripheral surface of the holder; a pulling magnet which is provided at the upper part of the stator and generates a magnetic force; a cap type rotor which is coupled to the upper end of the shaft integrally with the shaft so as to be located at the upper part of the pulling magnet and the stator and is provided on the upper part with a track having a different height from another; a magnet which is disposed on the inner peripheral surface of the rotor so that it can be opposed to the core of the stator with an air gap therebetween; and a turntable which is disposed on the upper surface of the rotor integrally with the rotor and is composed of a disk chuck on which a disk is centered and mounted, a jaw which is disposed on the disk chuck and fixes the mounted disk and a disk seat which supports the mounted disk from a lower side.

In another aspect of the present invention, there is provided a spindle motor for a disk drive, wherein the track is formed of a plurality of horizontal portions.

In yet another aspect of the present invention, there is provided a spindle motor for a disk drive, wherein the horizontal portions have an upward staircase structure in which they become gradually elevated in the outward direction from the shaft coupled to the center of the rotor.

In further another aspect of the present invention, there is provided a spindle motor for a disk drive, wherein the horizontal portions are formed in two.

In further another aspect of the present invention, there is provided a spindle motor for a disk drive, wherein the horizontal portions are composed of a first horizontal portion on which the lower end of the center portion of the disk chuck is bonding-fixed and a second horizontal portion on which the lower face of the disk chuck and the disk seat.

In further another aspect of the present invention, there is provided a spindle motor for a disk drive, wherein the horizontal portions are formed in three.

In further another aspect of the present invention, there is provided a spindle motor for a disk drive, wherein the horizontal portions are composed of a first horizontal portion on which the lower end of the center portion of the disk chuck is bonding-fixed, a second horizontal portion on which the lower face of the disk chuck is mounted and a third horizontal portion on which the disk seat is mounted.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings.

Figure 2:
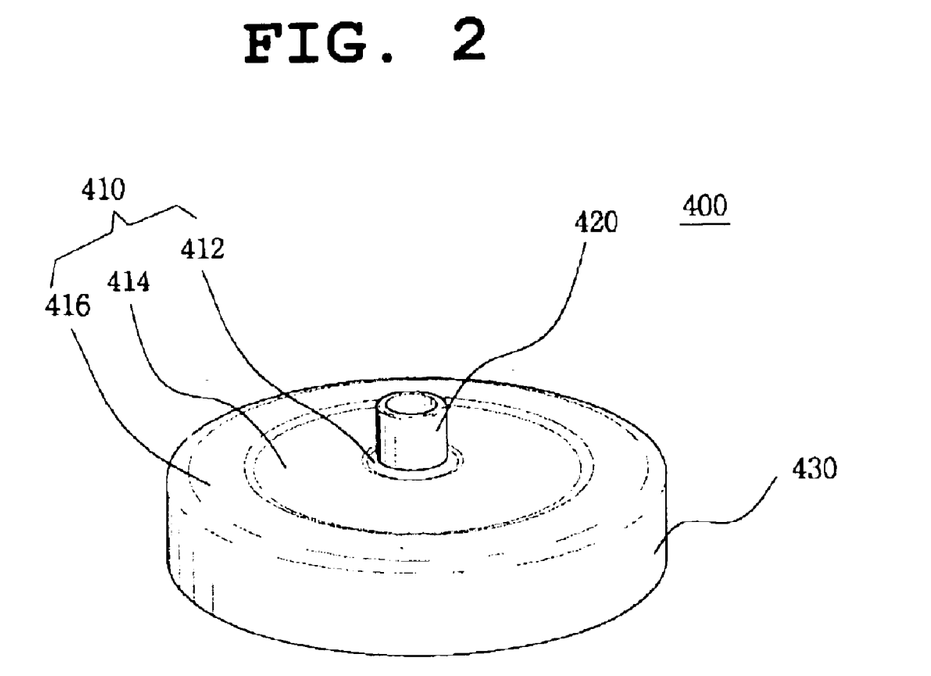
FIG. 2 is a perspective view illustrating a spindle motor for a disk drive according to the present invention.
Figure 3:
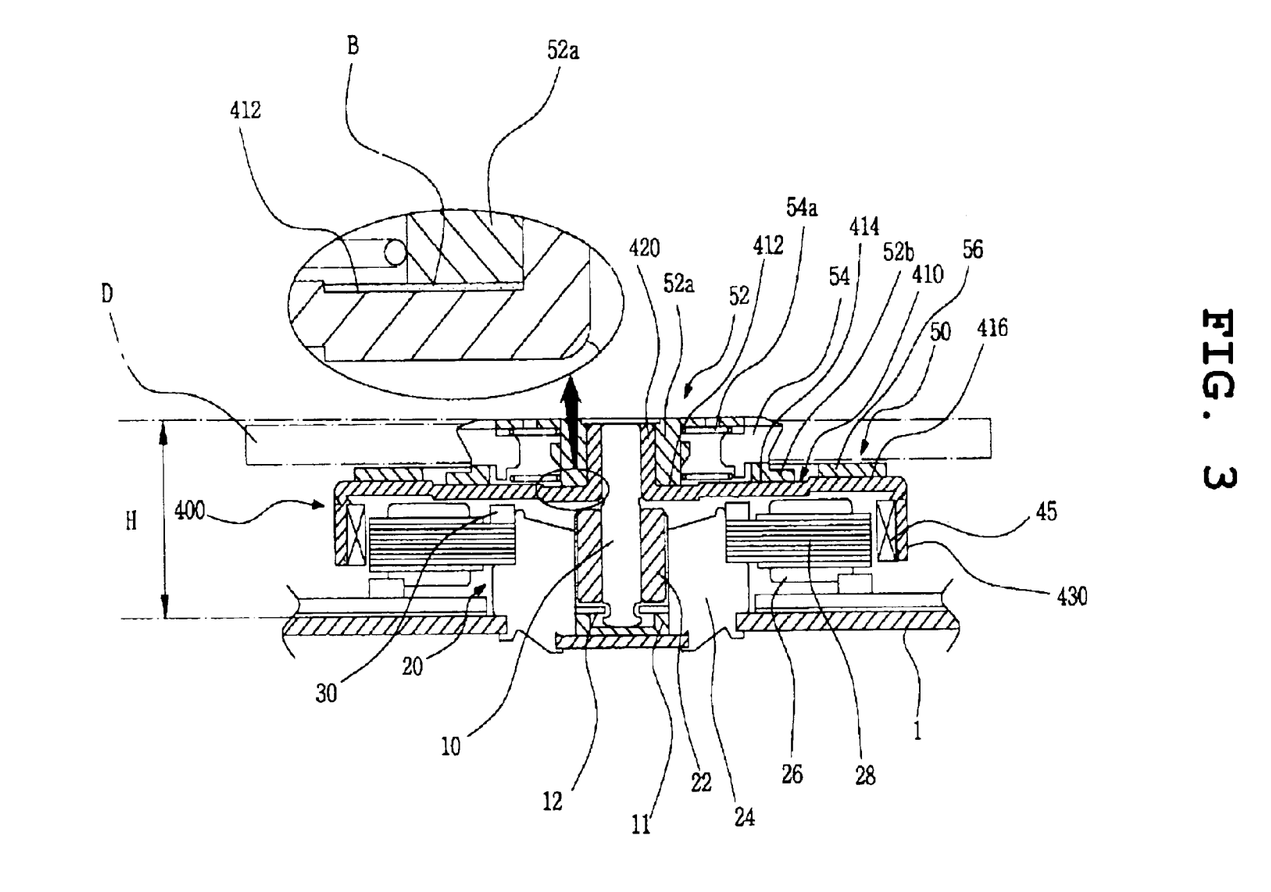
FIG. 3 is a side cross-sectional view illustrating the construction of the spindle motor for the disk drive according to the present invention.

FIG. 2 is a perspective view illustrating a spindle motor for a disk drive according to the present invention. FIG. 3 is a side cross-sectional view illustrating the construction of the spindle motor for the disk drive according to the present invention.

As illustrated therein, the spindle motor for the disk drive according to the present invention includes a deck plate 1 which has a circuit substrate mounted on the upper surface and is fixed to a disk player (not shown) and a shaft 10 which is rotatably disposed perpendicularly to the deck plate 1 and is provided with a thrust bearing 11 on the lower end face that is attached to the upper surface of the deck plate 1 and a washer-type stopper ring 12 at the lower end whose one side is fixed to the thrust bearing 11.

Of course, the stopper ring 12 serves to prevent the shaft 10 from deviating upward by a centrifugal force generated in case that the shaft 10 rotates at a high speed.

Also, the present invention includes a stator 20 which is disposed on the outer peripheral surface of the lower end of the shaft 10 and generates a magnetic force.

More specifically, the stator 20 includes a cylindrical metal bearing 22 which is disposed on the outer peripheral surface of the shaft 10 and supports the shaft 10 so as to stand vertically, a cylindrical holder 24 disposed on the outer peripheral surface of the metal bearing 22 and a core 28 wound with coils 26 which is disposed on the outer peripheral surface of the holder 24 and generates a magnetic force by an applied power.

Continuously, the present invention includes a cap type rotor 400 of metallic material which is coupled to the upper end of the shaft 10 so as to be located at the upper part of the stator 20.

This rotor 400 is composed of a cylindrical boss 420 vertically formed on the center, a track 410 extending horizontally from the boss 420 and having a different height from another and a cylinder 430 extending downward from the track 410.

Now that the rotor 400 is the most significant characteristic of the present invention, it will be explained in more detail. The rotor 400 is press-fit by forced-fitting the upper end of the shaft 10 to the inner peripheral surface of the boss 420 so that the rotor 400 can be formed integrally with the shaft 10.

The track of 410 of the rotor 400 is formed of a plurality of horizontal portions 412, 414 and 416 having a stepped portion by drawing processing. The horizontal portions 412, 414 and 416 are constructed in an upward staircase structure, in which they becomes gradually elevated in the outward direction from the shaft 10 inserted into the boss 420, that is, in the direction of the cylinder 430 that is an outer side of the track 410.

The horizontal portions 412, 414 and 416 are composed of a first horizontal portion 412 which is formed near the shaft 10 and has the smallest height, a second horizontal portion 414 which is formed at an outer side of the first horizontal portion 412 and is higher than the first horizontal portion 412 due to a stepped portion and a third horizontal portion which is formed at an outer side of the second horizontal portion 414 and is higher than the second horizontal portion due to a stepped portion.

In other words, the first horizontal portion 412 is formed adjacent to the shaft 10, the third horizontal portion 416 is formed adjacent to the cylinder 430's side and the second horizontal portion 414 is formed between the first horizontal portion 412 and the third horizontal portion 416.

Continuously, on the inner peripheral surface of the cylinder 430 of the rotor 400 is disposed a magnet 45 which is opposed to the core 28 with an air gap therebetween so as to interact with the magnetic force of the stator 20.

Additionally, at the upper part of the stator 20 is disposed a pulling magnet 30 of a ring type which performs an attractive force action with respect to the rotor 400.

Finally, on the upper surface of the rotor 400 is disposed a turntable 50 which is fixed integrally with the rotor 400 and mounts a disk (D).

This turntable 50 includes a disk chuck 52 on which the disk (D) is centered so as to be mounted at the precise position of the turntable 50, a jaw 54 which is slidably disposed at the disk chuck 52 and fixes the disk (D) mounted on the disk chuck 52 and a disk seat 56 which supports the mounted disk (D) from a lower side.

Of course, the jaw 54 is inserted into the lateral side of the disk chuck 52 along with a spring 54a and the disk seat 56 is formed integrally with the disk chuck 52, extending from the lower part of the disk chuck 52.

That is, the disk seat 56 is formed in an outward flange at the lower part of the disk chuck 52 and may be formed in a separate washer that is separated from the disk chuck 52.

Meanwhile, the turntable 50 is press-fit by forced-fitting the boss 420 of the rotor 400 into the inner diameter of the hub 52a which is the center portion of the disk chuck 52. The lower surface of the hub 52a is mounted on the first horizontal portion 412 of the rotor 400.

On the second horizontal portion 414 of the rotor 400 is mounted the lower face 52b of the disk chuck 52 and on the third horizontal portion 416 is mounted the disk seat 56.

However, in order to mount the lower end of the hub 52a of the disk chuck 52, the lower face 52b of the disk chuck 52 and the disk seat 56, respectively, on the first horizontal portion 412, second horizontal portion 414 and third horizontal portion 416, it is required to form a structure in which the lower part of the turntable 50 corresponds to the horizontal portions 412, 414 and 416.

In other words, as illustrated in FIG. 3, the lower face 52b of the disk chuck 52 must have a small thickness, so that the lower part of the hub 52a can protrude as much as the depth of the first horizontal portion 412. The disk seat 56 must be formed higher than the lower face 52b so as to correspond to the height of the third horizontal portion 416.

Of course, in case that the disk seat 56 is formed in a separate washer as described above, the disk seat 56 can be attached to the third horizontal portion 416 regardless of the structure of the lower part of the turntable 50.

Meanwhile, an adhesive (B) is coated on the upper surface of the first horizontal portion 412, on which the hub 52a of the disk chuck 52 is mounted, before the hub 52a is mounted, so that the hub 52a can be bonding-fixed to the first horizontal portion 412.

That is, the turntable 50 is firmly fixed to the rotor 400 integrally with the rotor 400 by the adhesive (B) coated on the lower surface of the hub 52a and the shaft 10 press-fit to the inner diameter of the hub 52a.

However, though not illustrated in the drawings, unlike the above description, the depth of the first horizontal portion 412 can be formed as much as the thickness of the adhesive (B). In this case, the lower end of the hub 52a of the disk chuck 52 must not be protruded.

More specifically, after processing the first horizontal portion 412 to have a fine depth, it is filled with the adhesive (B) up to the processed depth, and then the hub 52a is made to be located on the adhesive (B). In this state, when the adhesive (B) is hardened, the hub 52a is bonding-fixed to the first horizontal portion 412 by the portion contacting with the adhesive (B).

According to the thus constructed spindle motor of the present invention, the turntable 50 is firmly fixed to the rotor 400 and the adhesive (B) is coated uniformly on the upper surface of the first horizontal portion 412, thereby avoiding the adhesive (B) from being aggregated at one portion.

Hence, the turntable 50 is prevented from being lifted upward owing the adhesive (B), resultantly reducing the overall height (H) of the spindle motor. Also, since the adhesive (B) is adhered to the entire lower surface of the hub 52a, it is possible to obtain a wide adhesion surface area of the turntable 50 and the rotor 400, thus increasing the adhesive force of the turntable 50.

Additionally, since the lower face 52b of the disk chuck 52 is mounted on the second horizontal portion 414 of the rotor 400, the turntable 50 is mounted, being collapsed as much as the depth of the second horizontal portion 414 that is deep-drawn, thereby reducing the overall height (H) of the spindle motor as much.

In conclusion, because the overall height (H) of the spindle motor according to the present invention is smaller than that of a conventional spindle motor, the height of the disk player employing the spindle motor of the present invention also can be reduced and this makes it possible to manufacture a slim type disk player of a compact size.

Here, the operation of the above-described spindle motor of the present invention will be described.

In the spindle motor for the disk drive of the present invention, the disk (D) is fixed by centering a through hole formed at the center of the disk (D) on the disk chuck 52 of the turntable 50. During the fixing, the jaw 54 is slid into the lateral side of the disk chuck 52 via the through hole formed on the disk (D). Thereafter, when the centering is finished, the jaw 54 compresses the inside of the through hole of the disk (D) while slidably protruding to the outside of the disk chuck 52 by an elastic force of the spring 54a, thereby firmly fixing the disk (D).

Once the fixing of the disk (D) is finished, a power is applied to the coils 26 of the stator 20 to generate a magnetic force on the core 28. This makes the magnetic force of the core 28 and the magnetic force of the magnet 45 to interact with each other.

Then, the core 28 and the magnet 45 rotate the rotor 400 along with the shaft 10 at high speed by the interaction between their generated magnetic forces.

At this time, the shaft 10 can rotate at a high speed smoothly and vertically without movement by the metal bearing 22 disposed on the outer peripheral surface. Even if the shaft 10 is rotated at a high speed by the stopper ring 12 disposed at the lower end, it does not deviate upward.

That is, the metal bearing 22 supports the shaft 10 rotating at a high speed from the outer peripheral surface and the stopper ring 12 interrupts the shaft 10 from being lifted by a centrifugal force caused by the high-speed rotation.

The rotor 400 rotating at a high speed along with the shaft 10 is also likely to be lifted by the centrifugal force caused by the high-speed rotation, but is prevented from being lifted owing to an attractive force of the pulling magnet 30.

By the rotation of the rotor 400, the turntable 50 fixedly disposed on the upper surface of the rotor 400 rotates and the disk (D) mounted on the turntable 50 also rotates at a high speed along with the turntable 50. Therefore, the disk player (not shown) can records data on the disk (D) or reproduce the recorded data within a short time.

At this time, because the turntable 50 is firmly bonded to the rotor 400, it does not deviate from the rotor 400 even when the rotor 400 rotates at a high speed.

Of course, the disk (D) is firmly fixed by the jaw 54 of the turntable 50, so it is not lifted or deviated from the turn table 50 even when rotated at a high speed. Also, it is not lifted or deviates by a disk clamp (not shown) pressurizing the disk (D) from an upper side.

Figure 4:
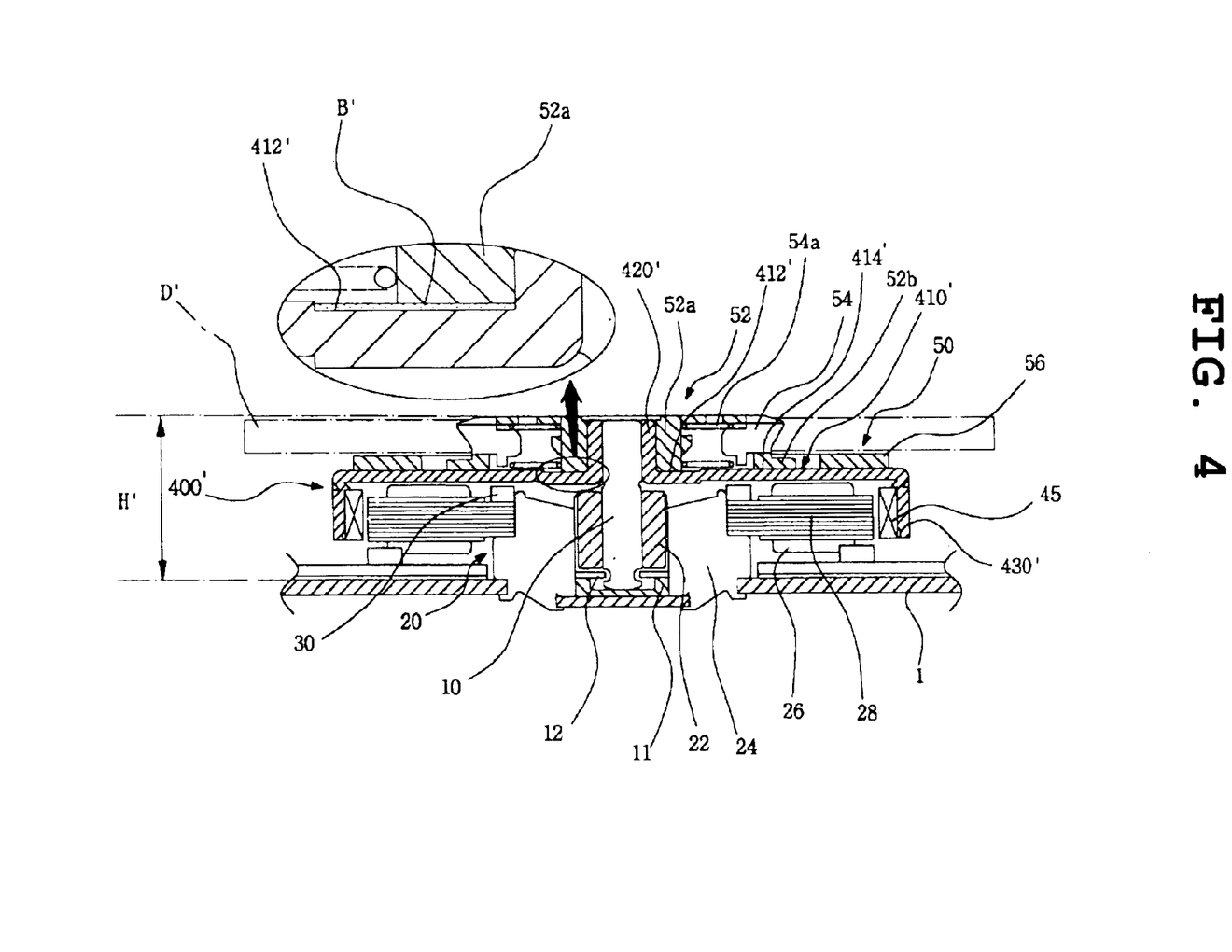
FIG. 4 is a side cross-sectional view illustrating the construction of a spindle motor for a disk drive according to another embodiment of the present invention.

FIG. 4 is a side cross-sectional view illustrating the construction of a spindle motor for a disk drive according to another embodiment of the present invention, where only two horizontal portions are formed on a track 410' of a rotor 400' unlike the spindle motor of the present invention illustrated in FIGS. 2 and 3.

As illustrated therein, the spindle motor according to another embodiment of the present invention includes a deck plate 1 which has a circuit substrate mounted on the upper surface and is fixed to a disk player (not shown), a thrust bearing 11 attached to the upper surface of the deck plate 1 and a shaft 10 rotatably disposed on the upper surface of the thrust bearing 11 perpendicularly to the deck plate 1.

To the lower end of the shaft 11 is coupled a washer type stopper ring 12 whose one end is attached to the thrust bearing 11 and which interrupts the shaft 10 from deviating upward. On the outer peripheral surface of the shaft 10 is disposed a stator 20 which supports the shaft so as to stand vertically and generates a magnetic force.

More specifically, the stator 20 includes a cylindrical metal bearing 22 disposed on the outer peripheral surface of the shaft 10 and a holder 24 which is disposed to surround the outer peripheral surface of the metal bearing 22 and is provided with a core 28 wound with coils 26.

On the upper part of the stator 20 is disposed a cap type rotor 400' of metallic material composed of a boss 420' formed at the center, a track 410' extending from the boss 420' and having a different height form another and a cylinder 430' extending downward from the track 410'.

At this time, the rotor 400' is fixed to the upper end of the shaft 10 so as to be disposed at the upper part of the stator 20. That is, the shaft 10 is inserted into the boss 420' of the rotor 400' by forced-fitting so that the shaft 10 and the rotor 400' can be integrally formed.

Meanwhile, the track 410' formed on the rotor 400' is formed of two horizontal portions 412' and 414' having a stepped portion by drawing processing. The horizontal portions 412' and 414' are constructed in an upward staircase structure in which they becomes gradually elevated in the outward direction of the track 410' from the shaft 10 inserted into the boss 420'.

Of course, the horizontal portions 412' and 414' are composed of a first horizontal portion 412' which is formed near the shaft 10 and has the smallest height and a second horizontal portion 414' which is formed at an outer side of the first horizontal portion 412 and is higher than the first horizontal portion 412' due to a stepped portion.

In other words, the first horizontal portion 412' is formed adjacent to the shaft 10 and the second horizontal portion 414' extends from the first horizontal portion 412'.

Continuously, on the inner peripheral surface of the cylinder 430' of the rotor 400' is disposed a magnet 45 which is opposed to the core 28 with an air gap therebetween so as to interact with the magnetic force of the stator 20.

Additionally, at the upper part of the stator 20 is disposed a pulling magnet 30 of a ring type which performs an attractive force action with respect to the rotor 400'.

Meanwhile, on the upper surface of the rotor 400' is disposed a turntable 50 which mounts a disk (D) and fixes the mounted disk (D) and is fixed integrally with the rotor 400.

This turntable 50 includes a disk chuck 52 on which the disk (D) is centered so as to be mounted at the precise position of the turntable 50, a jaw 54 which is slidably disposed at the disk chuck 52 and fixes the disk (D) mounted on the disk chuck 52 and a disk seat 56 which supports the mounted disk (D) from a lower side.

Of course, the jaw 54 is inserted into the lateral side of the disk chuck 52 along with a spring 54a and the disk seat 56 is integrally formed with the disk chuck 52, extending from the lower part of the disk chuck 52.

That is, the disk seat 56 is formed in an outward flange at the lower part of the disk chuck 52 and may be formed in a separate washer that is separated from the disk chuck 52.

Meanwhile, the turntable 50 is press-fit by forced-fitting the boss 420' of the rotor 400' into the inner diameter of the hub 52a which is the center portion of the disk chuck 52. The lower surface of the hub 52a is mounted on the first horizontal portion 412' of the rotor 400'.

At the second horizontal portion 414' of the rotor 400' are mounted the disk seat 56 and the lower face 52b of the disk chuck 52 with the exception of the hub 52a.

However, in order to mount the hub 52a and lower face 52b of the disk chuck 52, respectively, on the first horizontal portion 412' and second horizontal portion 414', it is required to form a structure in which the lower part of the turntable 50 corresponds to the horizontal portions 412' and 414'.

In other words, as illustrated in FIG. 4, the lower face 52b of the disk chuck 52 must have a small thickness, so that the lower part of the hub 52a can protrude as much as the depth of the first horizontal portion 412'. The disk seat 56 must be formed higher than the lower part of the hub 52a so as to correspond to the height of the second horizontal portion 414'.

Of course, in case that the disk seat 56 is formed in a separate washer as described above, the disk seat 56 can be attached to the second horizontal portion 414' regardless of the structure of the lower part of the turntable 50.

Meanwhile, an adhesive (B') is coated on the upper surface of the first horizontal portion 412', on which the hub 52a of the disk chuck 52 is mounted, before the hub 52a is mounted, so that the hub 52a can be bonding-fixed to the first horizontal portion 412'.

That is, the turntable 50 is firmly fixed to the rotor 400' integrally with the rotor 400' by the adhesive (B') coated on the lower surface of the hub 52a and the shaft 10 press-fit to the inner diameter of the hub 52a.

However, though not illustrated in the drawings, unlike the above description, the depth of the first horizontal portion 412' can be formed as much as the thickness of the adhesive (B'). In this case, the lower end of the hub 52a of the disk chuck 52 must not be protruded.

More specifically, after processing the first horizontal portion 412' to have a fine depth, it is filled with the adhesive (B') up to the processed depth, and then the hub 52a is made to be located on the adhesive (B'). In this state, when the adhesive (B') is hardened, the hub 52a is bonding-fixed to the first horizontal portion 412' by the portion contacting with the adhesive (B').

According to the thus constructed spindle motor according to the another embodiment of the present invention, the turntable 50 is firmly bonding-fixed to the rotor 400' and the adhesive (B'), which is deep-drawn to the rotor 400' as in the foregoing embodiment of the present invention, is coated uniformly on the first horizontal portion 412', thereby avoiding the adhesive (B') from being aggregated at one portion.

Hence, the turntable 50 is prevented from being lifted upward owing the adhesive (B'), resultantly reducing the overall height (H') of the spindle motor. Also, since the adhesive (B') is adhered to the entire lower surface of the hub 52a, it is possible to obtain a wide adhesion surface area of the turntable 50 and the rotor 400', thus increasing the adhesive force of the turntable 50.

That is to say, because the overall height (H') of the spindle motor according to the another embodiment of the present invention can be reduced as in the spindle motor of the foregoing embodiment, the height of the disk player employing this spindle motor also can be reduced and this makes it possible to manufacture a slim type disk player of a compact size.

Here, the operation of the spindle motor for the disk drive according to the another embodiment of the present invention will be described.

In the above-described spindle motor for the disk drive according to the another embodiment of the present invention, the disk (D) is fixed by centering a through hole formed at the center of the disk (D) on the disk chuck 52 of the turntable 50. During the fixing, the jaw 54 is slid into the lateral side of the disk chuck 52 via the through hole formed on the disk (D). Thereafter, when the centering is finished, the jaw 54 compresses the inside of the through hole of the disk (D) while slidably protruding to the outside of the disk chuck 52 by an elastic force of the spring 54a, thereby firmly fixing the disk (D).

Once the fixing of the disk (D) is finished, a power is applied to the coils 26 of the stator 20 to generate a magnetic force on the core 28. This makes the magnetic force of the core 28 and the magnetic force of the magnet 45 to interact with each other.

Then, the core 28 and the magnet 45 rotate the rotor 400' along with the shaft 10 at high speed by the interaction between their generated magnetic forces.

At this time, the shaft 10 can rotate at a high speed smoothly and vertically without movement by the metal bearing 22 disposed on the outer peripheral surface. Even if the shaft 10 is rotated at a high speed by the stopper ring 12 disposed at the lower end, it does not deviate upward.

That is, the metal bearing 22 supports the shaft 10 rotating at a high speed from the outer peripheral surface and the stopper ring 12 interrupts the shaft 10 from being lifted by a centrifugal force caused by the high-speed rotation.

The rotor 400' rotating at a high speed along with the shaft 10 is also likely to be lifted by the centrifugal force caused by the high-speed rotation, but is prevented from being lifted owing to an attractive force of the pulling magnet 30.

By the rotation of the rotor 400', the turntable 50 fixedly disposed on the upper surface of the rotor 400 rotates and the disk (D) mounted on the turntable 50 also rotates at a high speed along with the turntable 50. Therefore, the disk player (not shown) can records data on the disk (D) or reproduce the recorded data within a short time.

At this time, because the turntable 50 is firmly bonded to the rotor 400', it does not deviate from the rotor 400' even when the rotor 400' rotates at a high speed.

Of course, the disk (D) is firmly fixed by the jaw 54 of the turntable 50, so it is not lifted or deviated from the turn table 50 even when rotated at a high speed. Also, it is not lifted or deviates by a disk clamp (not shown) pressurizing the disk (D) from an upper side.

The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

While the invention has been shown and described with reference to certain preferred embodiments thereof, it will be understood by those skilled in the art that various changes in form and details may be made therein without departing from the spirit and scope of the invention as defined by the appended claims.

In the spindle motor for the disk drive according to the present invention that is constructed and operated as described above, the adhesive is uniformly coated on the horizontal portions of the rotor without being aggregated at one portion, so it is possible to prevent the turntable from being bonded in a lifted stated due to the adhesive, thereby reducing the overall height of the spindle motor. And, since the turntable can be disposed downward as much as the depth of the deep-drawn rotor, the overall height of the spindle motor can be reduced as much.

Moreover, it is possible to make the disk player slim because the height of the disk player can be reduced as much as the reduced height of the spindle motor.

Further, as the turntable is firmly bonded to the rotor because a wide adhesion surface area of the turntable can be obtained, the turntable can be prevented from deviating from the rotor, thereby lengthening the life span of the spindle motor.

What is claimed is:

1. A spindle motor for a disk drive, which is used for a disk player, comprising:
    a deck plate;
    a shaft rotatably disposed on the deck plate;
    a stator composed of a metal baring disposed on the outer peripheral surface of the shaft, a holder disposed on an outer side of the metal bearing and a core having coils disposed on the outer peripheral surface of the holder;
    a pulling magnet which is provided at the upper part of the stator and generates a magnetic force;
    a cap type rotor which is coupled to the upper end of the shaft integrally with the shaft so as to be located at the upper part of the pulling magnet and the stator and is provided on the upper part with a track having a different height from another;
    a magnet which is disposed on the inner peripheral surface of the rotor so that it can be opposed to the core of the stator with an air gap therebetween; and
    a turntable which is disposed on the upper surface of the rotor integrally with the rotor and is composed of a disk chuck on which a disk is centered and mounted, a jaw which is disposed on the disk chuck and fixes the mounted disk and a disk seat which supports the mounted disk from a lower side;
    wherein the track is formed of three horizontal portions;
    wherein the horizontal portions have an upward staircase structure in which they become gradually elevated in the outward direction from the shaft coupled to the center of the rotor.

2. The spindle motor of claim 1, wherein the horizontal portions are composed of a first horizontal portion on which the lower end of the center portion of the disk chuck is bonding-fixed, a second horizontal portion on which the lower face of the disk chuck is mounted and a third horizontal portion on which the disk seat is mounted.

3. A spindle motor for a disk drive, which is used for a disk player, comprising;
    a deck plate;
    a shaft rotatably disposed on the deck plate;
    a stator composed of a metal baring disposed on the outer peripheral surface of the shaft, a holder disposed on an outer side of the metal bearing and a core having coils disposed on the outer peripheral surface of the holder;
    a pulling magnet which is provided at the upper part of the stator and generates a magnetic force;
    a cap type rotor which is coupled to the upper end of the shaft integrally with the shaft so as to be located at the upper part of the pulling magnet and the stator and is provided on the upper part with a track having a different height from another;
    a magnet which is disposed on the inner peripheral surface of the rotor so that it can be opposed to the core of the stator with an air gap therebetween; and
    a turntable which is disposed on the upper surface of the rotor integrally with the rotor and is composed of a disk chuck on which a disk is centered and mounted, a jaw which is disposed on the disk chuck and fixes the mounted disk and a disk seat which supports the mounted disk from a lower side;
    wherein, the track is formed of two horizontal portions
    wherein the horizontal portions have an upward staircase structure in which they become gradually elevated in the outward direction from the shaft coupled to the center of the rotor
    wherein the horizontal portions are composed of a first horizontal portion on which the lower end of the center portion of the disk chuck is bonding-fixed and a second horizontal portion on which the lower face of the disk chuck and the disk seat.

* * * * *